Oct. 22, 1935.    H. A. DE VRY    2,018,514
FRAMING MECHANISM FOR PROJECTORS
Filed Aug. 27, 1934    3 Sheets-Sheet 1

Inventor
Herman A. DeVry

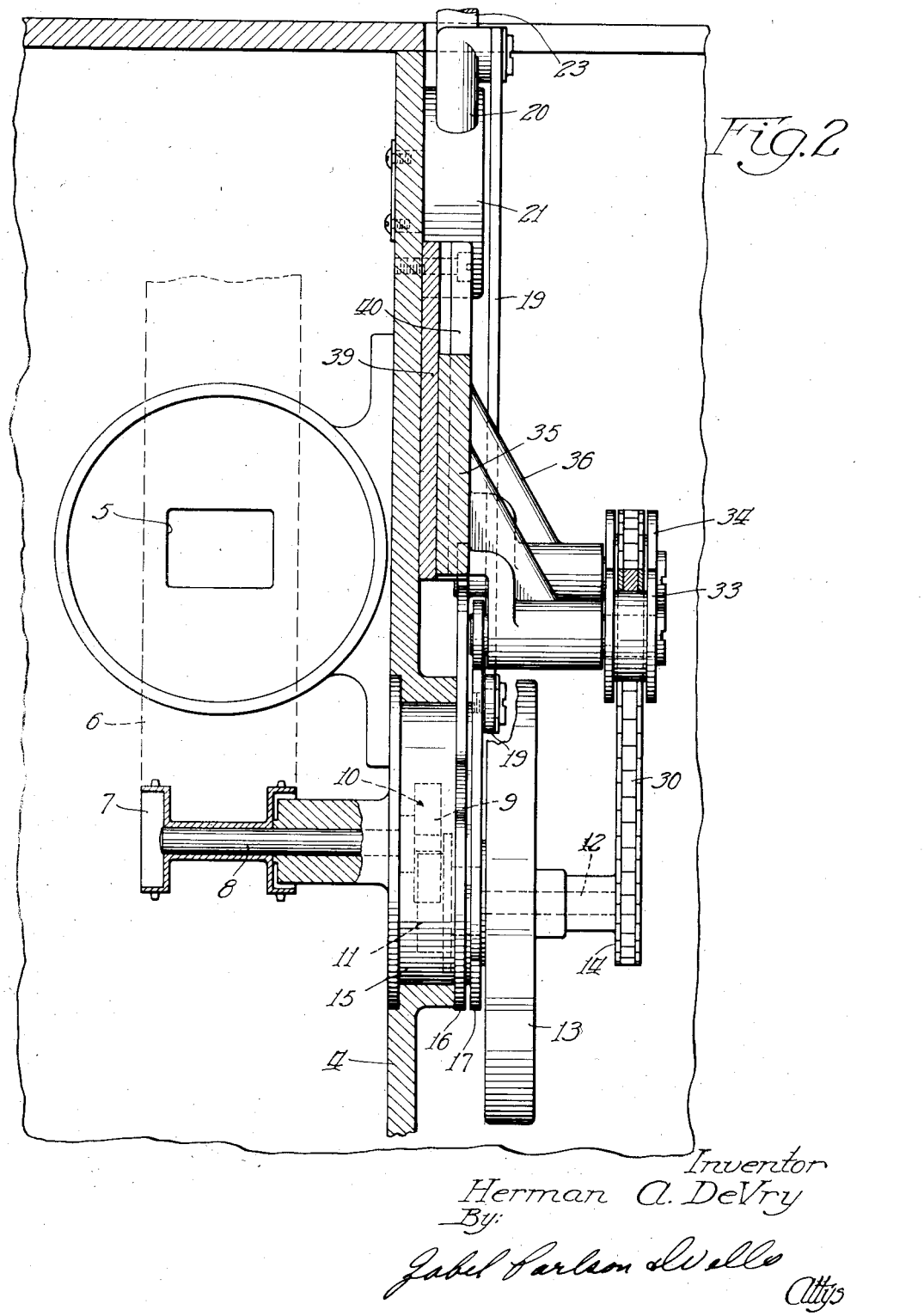

Oct. 22, 1935.   H. A. DE VRY   2,018,514
FRAMING MECHANISM FOR PROJECTORS
Filed Aug. 27, 1934   3 Sheets-Sheet 3
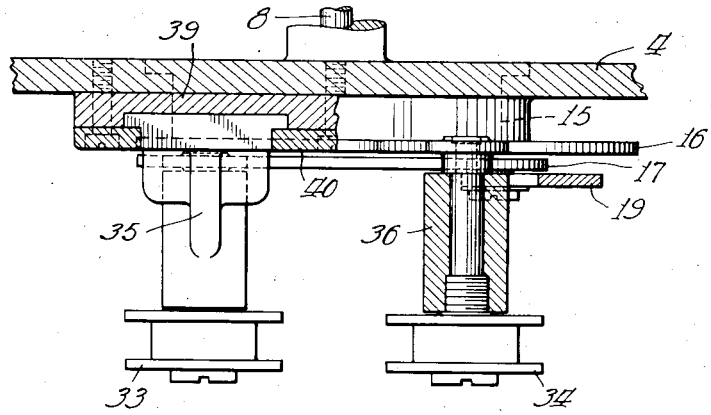
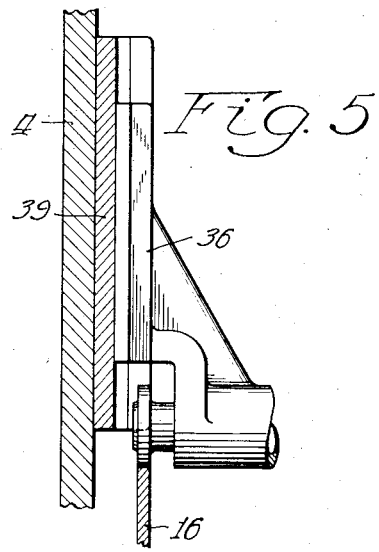
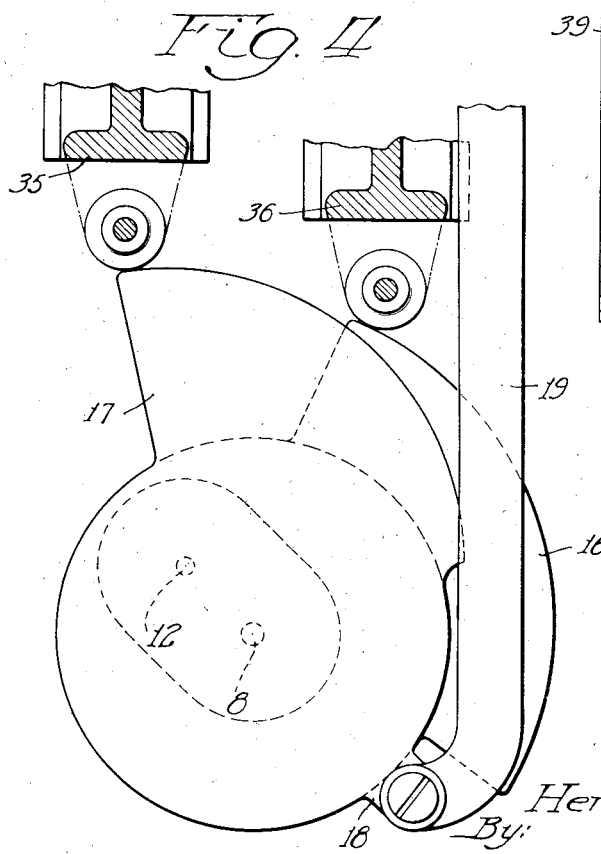
Inventor
Herman A. DeVry
By:

Patented Oct. 22, 1935

2,018,514

UNITED STATES PATENT OFFICE 2,018,514

FRAMING MECHANISM FOR PROJECTORS

Herman A. de Vry, Chicago, Ill.

Application August 27, 1934, Serial No. 741,584

10 Claims. (Cl. 88—17)

My invention relates to framing mechanism for motion picture machines and more particularly to improvements in framing mechanisms such as are shown in my prior application, Serial No. 715,056, filed March 12, 1934.

In projectors the matter of properly framing the picture on the screen involves considerable difficulty because it is necessary to maintain synchronism between the shutter operating mechanism, sound reproducing mechanism, and the film moving mechanism which gives the intermittent movement necessary for the projection of the pictures.

In my prior application mentioned above, I have illustrated means for framing the picture which embodies utilizing a flexible drive for the intermittent mechanism and the other mechanisms which must be kept in synchronism therewith.

In the present device it is a purpose to provide a simplified mechanism, also using a flexible chain drive wherein it is unnecessary to shift the axis of the film sprocket on the intermittent mechanism out of its normal position. In machines of this character it is the better practice to place the film sprocket of the intermittent mechanism close to the aperture with which the picture must be framed in order to avoid inaccuracies and to obtain a steadier projection of the picture.

The present invention contemplates a mechanism which permits the placing of the film sprocket in the best possible position with respect to the aperture and maintaining it there for all framing adjustments necessary in framing the picture.

I will describe the preferred form of the invention by reference to the accompanying drawings wherein—

Fig. 2 is a sectional view substantially on the line 2—2 of Fig. 1;

Fig. 3 is a sectional view on the line 3—3 of Fig. 1;

Fig. 4 is a fragmentary elevational view showing a changed position from that shown in Fig. 1, and Fig. 5 is a sectional view on line 5—5 of Fig. 1.

Figure 1:
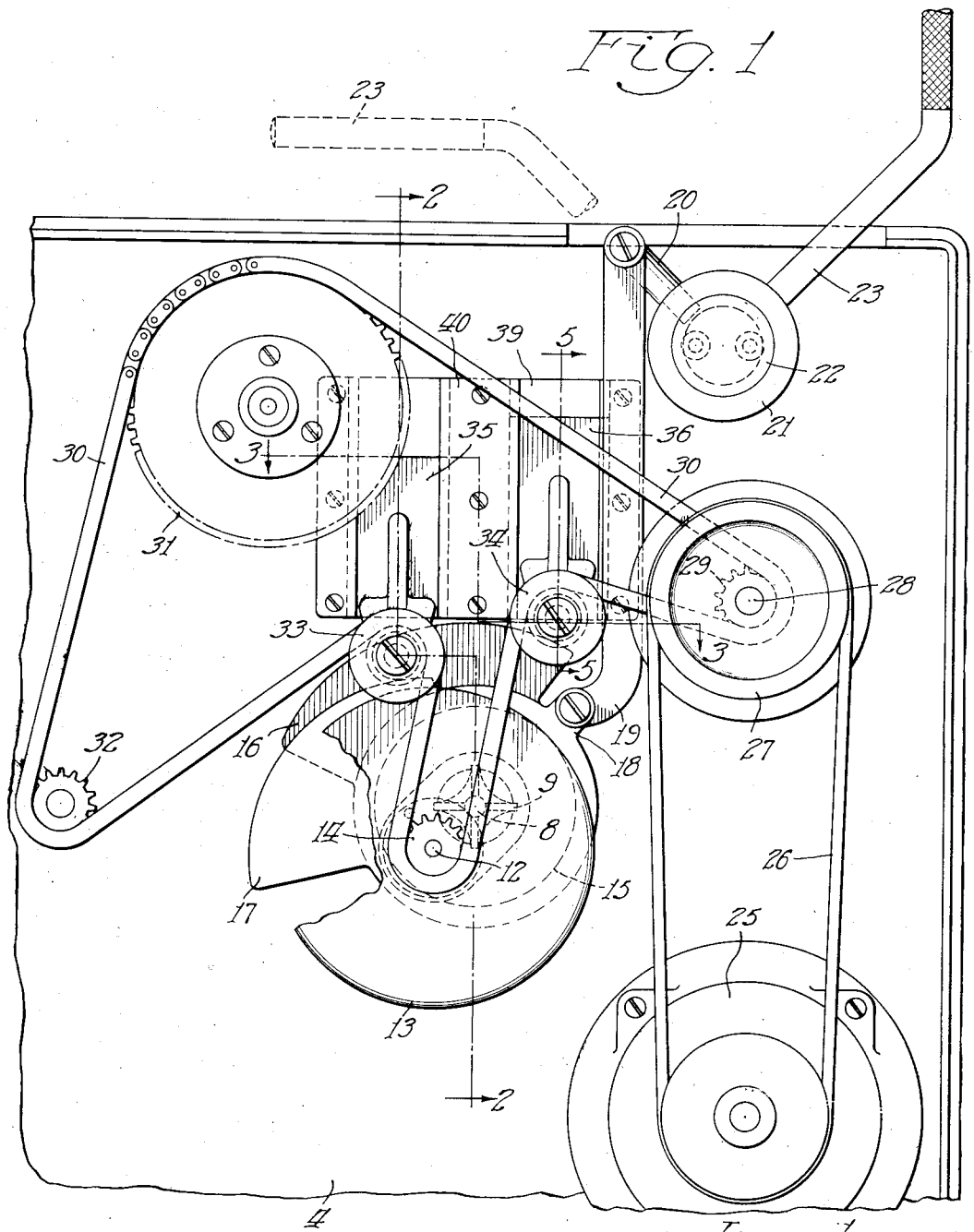
Fig. 1 is a side elevation of a portion of a projector frame showing the framing mechanism mounted thereon.

Referring now in detail to the drawings, the only portions of the projector mechanism shown herein are those which particularly operate with, or are acted upon by the framing mechanism.

The numeral 5 indicates the aperture in which the pictures on the film 6 (shown in dotted lines in Fig. 2) must be framed.

The film sprocket 7 is the sprocket which intermittently advances the film past the aperture 5. This sprocket is mounted on the drive shaft 8 which is driven from the member 9 of the Geneva gear movement indicated at 10. The other member 11, of the Geneva gear is fixed to a shaft 12 which has mounted thereon the fly wheel 13 and the drive chain sprocket wheel 14.

The operation of the Geneva type of intermittent movement is so well known that it is believed to be unnecessary to further describe it.

The entire intermittent mechanism just described is carried by the rotatable member 15. This member is mounted in the frame plate 4 so that it may be rotated about the axis of the shaft 8 as a center.

Fixed to the member 15 are a pair of cams 16 and 17 and one of these cams has a projection 18 thereon to which the link 19 is pivoted, this link being connected at its other end to the framing lever 20 which is rotatably mounted by means of the ring 21 upon the stud 22 mounted on the frame.

From the above description it is clear that by moving the lever 20, for example by means of the hand piece 23, the cams 16 and 17 and the member 15 may be rotated in the frame 4 about the axis of the shaft 8 as a center, thus turning the entire intermittent mechanism and the film sprocket 7 which is fixed to the shaft 8.

Turning of the film sprocket 7 will, of course, move the film up or down with respect to the aperture 5.

The driving mechanism for the entire projector consists of a motor 25 which drives the flexible drive member 26 which in turn drives the pulley 27 on the shaft 28. Shaft 28 is preferably the shutter shaft and it carries thereon a suitable chain sprocket wheel 29 by means of which the sprocket chain 30 is driven to drive the other mechanism of the projector.

In the present case the film feed sprocket 31 and the sprocket wheel 32 are driven by the chain 30, and this chain also passes around the sprocket wheel 14 and drives the intermittent film advancing mechanism.

It is believed to be evident from an inspection of Fig. 1, that the rotation of the intermittent mechanism about the axis of the shaft 8 would change the relative positions of sprocket wheels 14 and 29 because the sprocket wheel 14 would be shifted around from the position shown in Fig. 1 to the position indicated by the dotted lines in Fig. 4 or some other intermediate position. Such a change in the relative positions of the sprocket wheels would throw their respective mechanisms out of synchronism by changing the length of chain between them unless some compensating means is provided. It is to compensate for this change in position, or course, of the drive chain 30, that the cams 16 and 17 are provided. It will be noted from Fig. 1 that the chain 30 passes over a pair of idler pulleys 33 and 34. These pulleys are carried up on the slides 35 and 36 so as to be movable up and down with the slides. The slides are secured to the frame 4 for vertical sliding movement by means of the back plate 39 and the central plate 40 in a manner which it is believed will be clear from the showing in Figs. 1—2—3. The lower ends of the slides are adapted to be engaged by the cams 16 and 17; that is to say, cam 16 is adapted to engage the slide 36, while cam 17 engages the slide 35.

The cam surfaces are so shaped as to take up, or compensate for, the changes in the length of drive chain 30 between sprocket wheel 14 and the respective wheels 32 and 29, as the intermittent mechanism is rotated bodily about the axis of the shaft 8 by turning the member 15.

The operation of these cams as a compensating means is evident upon a comparison of Fig. 1 and Fig. 4, where it is clear that a substantial change has been made in the position of the slide 35 when the intermittent mechanism was moved from the position shown in Fig. 1 to that indicated in Fig. 3, and the movement of the slide 36 during the same time has been relatively small, since there has been relatively little change in the distance between sprocket wheel 14 and sprocket wheel 29.

From the above description it is believed to be clear that I have provided a simple framing mechanism whereby the picture may be properly framed in the aperture of the projector and synchronism maintained between the various drive elements merely by rotating the intermittent mechanism about the axis of the intermittent film sprocket and compensating for the changes in position of the sprocket wheel 14 by adjustment of the flexible drive chain 30.

While I have shown one form which my invention may take, it is obvious that various modifications may be made from the exact details shown and described without departing from the scope of the invention.

It is, therefore, my purpose to claim all novelty in the invention as broadly as possible in view of the prior art.

Having thus described my invention and what I claim as new, and desire to secure by Letters Patent, is:

1. A motion picture apparatus having in combination an aperture in which the pictures are framed, and intermittent mechanism including a film sprocket for moving the film past said aperture and means to frame the picture in said aperture comprising a rotatably mounted support for said intermittent mechanism, drive means for said intermittent mechanism including a flexible drive member and means movable in response to rotation of said support for framing the picture for changing the course of said flexible drive member.

2. A motion picture mechanism having an aperture and means for moving film past said aperture including an intermittent drive mechanism for advancing the film, a sprocket wheel driving said mechanism, a second sprocket wheel spaced from said first named sprocket wheel, a flexible drive element connecting said sprocket wheels, a rotatable support for said intermittent mechanism, rotatable to frame the film picture at the aperture, and means actuated by rotation of said support to change the course of the drive element between said sprocket wheels.

3. A motion picture mechanism having an aperture and means for moving film past said aperture including an intermittent drive mechanism for advancing the film, a sprocket wheel driving said mechanism, a second sprocket wheel spaced from said first named sprocket wheel, a flexible drive element connecting said sprocket wheels, a rotatable support for said intermittent mechanism, rotatable to frame the film picture at the aperture, and means actuated by rotation of said support to change the course of the drive element between said sprocket wheels, said means comprising a movable guide over which said flexible drive member rides between the sprocket wheels, said guide being operatively connected with said support.

4. A motion picture mechanism having an aperture and means for moving film past said aperture including an intermittent drive mechanishm for advancing the film, a sprocket wheel driving said mechanism, a second sprocket wheel spaced from said first named sprocket wheel, a flexible drive element connecting said sprocket wheels, a rotatable support for said intermittent mechanism, rotatable to frame the film picture at the aperture, and means actuated by rotation of said support to change the course of the drive element between said sprocket wheels, said means comprising a guide pulley over which the flexible drive member passes between the sprocket wheels and mechanism for moving said guide pulley simultaneously with the rotation of said support.

5. A motion picture machine having in combination, an aperture, means for moving film past said aperture including a film sprocket and an intermittent drive mechanism for said sprocket, and a shutter drive shaft adapted to be operated in synchronism with the intermittent mechanism, a drive shaft for said mechanism, and a flexible drive element connecting said shafts, a rotatable support for said mechanism and film sprocket rotatable to frame the picture on the film in said aperture, and means co-operating with said flexible drive element to maintain synchronism between said shutter drive shaft and said mechanism in all positions of said support.

6. A motion picture machine having in combination, an aperture, means for moving film past said aperture including a film sprocket and an intermittent drive mechanism for said sprocket, and a shutter drive shaft adapted to be operated in synchronism with the intermittent mechanism, a drive shaft for said mechanism, and a flexible drive element connecting said shafts, a rotatable support for said mechanism and film sprocket rotatable to frame the picture on the film in said aperture, and means co-operating with said flexible drive element to maintain synchronism between said shutter drive shaft and said mechanism in all positions of said support, said last named means including a movable guide over which said flexible drive element passes between the drive shafts.

7. A motion picture machine having in combination, an aperture, means for moving film past said aperture including a film sprocket and an intermittent drive mechanism for said sprocket, and a shutter drive shaft adapted to be operated in synchronism with the intermittent mechanism, a drive shaft for said mechanism, and a flexible drive element connecting said shafts, a rotatable support for said mechanism and film sprocket rotatable to frame the picture on the film in said aperture, and means co-operating with said flexible drive element to maintain synchronism between said shutter drive shaft and said mechanism in all positions of said support, said last named means including a pair of separately movable guides engaging said flexible drive element on opposite sides of the drive shaft for said intermittent mechanism.

8. A motion picture machine having in combination, an aperture, means for moving film past said aperture including a film sprocket and an intermittent drive mechanism for said sprocket, and a shutter drive shaft adapted to be operated in synchronism with the intermittent mechanism, a drive shaft for said mechanism, and a flexible drive element connecting said shafts, a rotatable support for said mechanism and film sprocket rotatable to frame the picture on the film in said aperture, and means co-operating with said flexible drive element to maintain synchronism between said shutter drive shaft and said mechanism in all positions of said support, said last named means including a movable guide over which said flexible drive element passes between the drive shafts, and means actuated by said rotatable support for moving said guide.

9. A motion picture machine having in combination, an aperture, means for moving film past said aperture including a film sprocket and an intermittent drive mechanism for said sprocket, and a shutter drive shaft adapted to be operated in synchronism with the intermittent mechanism, a drive shaft for said mechanism, and a flexible drive element connecting said shafts, a rotatable support for said mechanism and film sprocket rotatable to frame the picture on the film in said aperture, and means co-operating with said flexible drive element to maintain synchronism between said shutter drive shaft and said mechanism in all positions of said support, said last named means including a pair of separately movable guides engaging said flexible drive element on opposite sides of the drive shaft for said intermittent mechanism, and means actuated by said support for moving said guides.

10. A motion picture machine having in combination, an aperture, means for moving film past said aperture including a film sprocket and an intermittent drive mechanism for said sprocket, and a shutter drive shaft adapted to be operated in synchronism with the intermittent mechanism, a drive shaft for said mechanism, and a flexible drive element connecting said shafts, a rotatable support for said mechanism and film sprocket rotatable to frame the picture on the film in said aperture, and means co-operating with said flexible drive element to maintain synchronism between said shutter drive shaft and said mechanism in all positions of said support, said last named means including a pair of separately movable guides engaging said flexible drive element on opposite sides of the drive shaft for said intermittent mechanism, and a pair of cam members on said support for moving said guides.

HERMAN A. DE VRY.